(12) United States Patent
Lebrato-Rastrojo et al.

(10) Patent No.: US 11,926,382 B2
(45) Date of Patent: Mar. 12, 2024

(54) ASSEMBLY SYSTEM FOR AUTOMOTIVE LAMPS AND OPERATION METHOD THEREOF

(71) Applicant: Hella GmbH & Co. KGaA, Lippstadt (DE)

(72) Inventors: Miguel Lebrato-Rastrojo, Paderborn (DE); Ludger-Josef Grüne, Lippstadt (DE); Ingo Engler, Soest (DE); Thomas Albert Röbbecke, Erwitte (DE); Jun Yue, Zhejiang (CN); Tao Hu, Zhejiang (CN); Wei Hu, Zhejiang (CN)

(73) Assignee: Hella GmbH & Co. KGaA, Lippstadt (DE)

( * ) Notice: Subject to any disclaimer, the term of this patent is extended or adjusted under 35 U.S.C. 154(b) by 300 days.

(21) Appl. No.: 17/206,245

(22) Filed: Mar. 19, 2021

(65) Prior Publication Data

US 2021/0206441 A1 Jul. 8, 2021

Related U.S. Application Data

(63) Continuation of application No. PCT/CN2018/125367, filed on Dec. 29, 2018.

(30) Foreign Application Priority Data

Sep. 20, 2018 (CN) .......................... 201811100484.1

(51) Int. Cl.
*B62D 65/16* (2006.01)
*G05B 19/41* (2006.01)
*G05B 19/418* (2006.01)

(52) U.S. Cl.
CPC ....... *B62D 65/16* (2013.01); *G05B 19/41805* (2013.01); *G05B 19/41815* (2013.01)

(58) Field of Classification Search
CPC .............. B62D 65/16; G05B 19/41815; G05B 19/41805; B23P 21/004; B23P 23/06
See application file for complete search history.

(56) References Cited

U.S. PATENT DOCUMENTS

| | | | |
|---|---|---|---|
| 11,707,846 B2 * | 7/2023 | Gruene | .................. B25J 9/0096 700/245 |
| 2021/0197385 A1 * | 7/2021 | Gruene | ................ B25J 15/0052 |

FOREIGN PATENT DOCUMENTS

| | | | | |
|---|---|---|---|---|
| CN | 203409492 U | * | 1/2014 | |
| CN | 203409492 U | | 1/2014 | |
| CN | 204771514 U | * | 11/2015 | |
| CN | 204771514 U | | 11/2015 | |
| CN | 107042408 A | * | 8/2017 | ............ B23P 19/008 |

(Continued)

*Primary Examiner* — Bayan Salone
(74) *Attorney, Agent, or Firm* — Husch Blackwell LLP

(57) ABSTRACT

An assembly system is provided for automotive lamps and an operation method thereof. The assembly system includes two kinds of functional robots and many functional stations, and it uses the functional robots to transfer workpieces between the various functional stations to realize automatic gluing, fastening and whole lamp performance testing, etc., thereby reducing the amount of manual intervention and improving process integration. Further, the assembly system may provide an assembly system with a two-sided assembly line operating simultaneously, which greatly improves the working efficiency of thereof.

7 Claims, 2 Drawing Sheets

(56) References Cited

FOREIGN PATENT DOCUMENTS

| | | | | |
|---|---|---|---|---|
| CN | 107042408 A | | 8/2017 | |
| CN | 107504031 A | * | 12/2017 | ............ F16B 11/006 |
| CN | 107504031 A | | 12/2017 | |
| CN | 206811469 U | * | 12/2017 | |
| CN | 206811469 U | | 12/2017 | |
| JP | 2001121364 A | * | 5/2001 | .......... G01M 11/061 |
| JP | 2001121364 A | | 5/2001 | |

* cited by examiner

ASSEMBLY SYSTEM FOR AUTOMOTIVE LAMPS AND OPERATION METHOD THEREOF

CROSS REFERENCE

This application claims priority to PCT Application No. PCT/CN2018/125367, filed Dec. 29, 2018, which itself claims priority to Chinese Application No. 201811100484.1, filed Sep. 20, 2018, the entirety of both of which are hereby incorporated by reference.

FIELD OF THE INVENTION

The present invention relates to the technical field of automotive lamp manufacture and, more particularly, to an assembly system for automotive lamps and an operating method thereof.

BACKGROUND

With the development of science and technology, the automotive industry is also rapidly advancing and more and more requirements are put forward to automobile performance, and the functionality, appearance and cost performance of automobiles are the evaluation factors for purchasing and using automobiles. As lighting devices for automobiles, automotive lamps also achieve decorative effects on automobiles and draw more and more attention. However, the assembly of automotive lamps directly affects the lifespan and performance thereof.

Traditional assembly of lamp lens and lamp housing of an automotive headlamp mainly includes gluing, optical testing and lamp sealing performance testing, but each of the above processes works separately, and requires a large number of workers to carry and transport the workpieces, and this results in a long waiting time between processing steps, low process integration and high processing costs.

SUMMARY OF THE INVENTION

In order to solve the above problems, the present invention provides an assembly system for automotive lamps and an operation method thereof. The assembly system includes two kinds of functional robots and many functional stations, and it uses the functional robots to transfer workpieces between the various functional stations to realize automatic gluing, fastening and whole lamp performance testing, etc, thereby reducing the amount of manual intervention and improving process integration. On the other hand, the assembly system provides an assembly system with a two-sided assembly line operating simultaneously, which greatly improves the working efficiency of thereof.

Specifically, an aspect of the present invention provides an assembly system for automotive lamps, the assembly system comprising: a gluing station, a lamp housing and lamp lens transport station, a first optical test station, a second optical test station, a whole lamp sealing performance test station and a whole lamp transport station—which are disposed sequentially; an assembly station disposed near the gluing station and the lamp housing and lamp lens transport station; a whole lamp turnover station disposed near the lamp housing and lamp lens transport station and the first optical test station; and a lamp housing carrying robot and a whole lamp carrying robot.

Preferably, the gluing station, the lamp housing and lamp lens transport station, the assembly station and the whole lamp turnover station are located in the working area of the lamp housing carrying robot; the whole lamp turnover station, the first optical test station, the second optical test station, the whole lamp sealing performance test station and the whole lamp transport station are located in the working area of the whole lamp carrying robot.

Preferably, the lamp housing and lamp lens transport station is a circular transport station comprising at least two loading positions, with positioning fixtures corresponding to the lamp housing or the lamp lens disposed at the loading positions.

Preferably, a glue gun and a plasma processing unit are disposed at the gluing station.

Preferably, a nailing fixture and a nail gun are disposed at the assembly station.

Preferably, the whole lamp turnover station comprises a workpiece platform, the workpiece platform comprising at least one loading position or unloading position, the workpiece platform rotating at a preset rate.

Preferably, a gluing machine is disposed near the gluing station.

In another aspect, the present invention provides an assembly system for automotive lamps, the assembly system comprising a first assembly line and a second assembly line, wherein: each of the first assembly line and the second assembly line includes the assembly system as defined above, and the first assembly line and the second assembly line are symmetrical.

In another aspect, the present invention provides an operation method of the assembly system for automotive lamps, the operation method comprising the following steps: the lamp housing and lamp lens transport station transports an automotive lamp housing to be processed to a processing location, the lamp housing carrying robot grabs the lamp housing from the lamp housing and lamp lens transport station and moves it to the gluing station; the gluing station dispenses glue to the lamp housing; the lamp housing carrying robot carries and places the lamp housing to the assembly station; the lamp housing and lamp lens transport station transports an automotive lamp lens to be processed to a processing location, the lamp housing carrying robot goes back to the lamp housing and lamp lens transport station and grabs the lamp lens, moves it to the assembly station, and fastens the lamp lens to the lamp housing to form a whole lamp; the lamp housing carrying robot carries the whole lamp to the whole lamp turnover station; the whole lamp carrying robot carries the whole lamp from the whole lamp turnover station to the first optical test station or the second optical test station; the first optical test station or the second optical test station conducts an optical test and adjustment for the whole lamp; the whole lamp carrying robot carries the whole lamp from the first optical test station or the second optical test station to the whole lamp sealing performance test station; the whole lamp sealing performance test station conducts sealing performance test on the whole lamp; the whole lamp carrying robot carries the whole lamp from the whole lamp sealing performance test station to the whole lamp transport station, and the whole lamp waits to be unloaded here.

Preferably, the lamp housing and lamp lens transport station is a circular transport station and provided with at least two loading positions and a unloading position, the automotive lamp housing and lamp lens being placed alternately at the loading positions; a first loading position with the lamp housing placed thereat moves to the processing location, and the lamp housing carrying robot grabs the lamp housing from the first loading position; a second loading position with the lamp lens placed thereat moves toward the processing location, and when the lamp housing carrying robot moves back to the lamp housing and lamp lens transport station, the second loading position arrives at the processing location, and the lamp housing carrying robot grabs the lamp lens from the second loading position.

Preferably, the step of the gluing station dispensing glue to the automotive lamp housing includes: the lamp housing carrying robot moves the lamp housing according to a preset route; the plasma processing unit at the gluing station performs surface treatment on the surface of the automotive lamp housing; the lamp housing carrying robot moves the lamp housing according to a preset route, and the glue dispensing gun at the gluing station dispenses glue to the glue groove of the lamp housing.

Preferably, the step of fastening the lamp lens to the lamp housing to form a whole lamp includes: the nail gun at the assembly station shoots nails into the preset positions of the fastened lamp housing and lamp lens to fixedly connect the fastened lamp housing and lamp lens.

Preferably, the workpiece platform at the whole lamp turnover station rotates at a preset rate; the lamp housing carrying robot carries the whole lamp to the loading position of the whole lamp turnover station at a first frequency; the whole lamp carrying robot carries the whole lamp from the unloading position of the whole lamp turnover station to the first optical test station or the second optical test station at a second frequency.

Preferably, the step of the whole lamp carrying robot transporting the whole lamp from the whole lamp turnover station to the first optical test station or the second optical test station includes: the whole lamp carrying robot detects whether a whole lamp is already present in the first optical test system or the second optical test system, and places a new whole lamp to the first optical test station or the second optical test station.

Preferably, the gluing machine is disposed near the gluing station, and the gluing machine dispenses glue into the glue gun regularly.

In another aspect, the present invention provides an operation method of the assembly system for automotive lamps, wherein: the assembly system includes a first assembly line and a second assembly line; the first assembly line and the second assembly line are symmetrical, and both operate according to the operation method as defined above.

Compared with the prior art, the advantages of the present invention are:

(1) it uses two kinds of functional robots to coordinate the transportation of workpieces between various functional stations.

(2) it realizes automatic gluing, fastening and whole lamp performance testing, thereby reducing the amount of manual intervention and improving process integration.

(3) It provides a whole lamp turnover station and a whole lamp transport station, reasonably adjusting the waiting time caused by transmission rate differences between processes.

(4) It further provides a two-sided assembly line operating simultaneously to significantly improve the working efficiency of the assembly system.

BRIEF DESCRIPTION OF THE DRAWINGS

Reference is now made more particularly to the drawings, which illustrate the best presently known mode of carrying out the invention and wherein similar reference characters indicate the same parts throughout the views.

REFERENCE NUMBERS

1—lamp housing and lamp lens transport station
2—first optical test station
3—second optical test station
4—whole lamp sealing performance test station
5—whole lamp transport station
6—gluing station
7—assembly station
8—whole lamp turnover station
9—lamp housing carrying robot
10—whole lamp carrying robot
11—gluing machine.

DETAILED DESCRIPTION OF THE DRAWINGS

The advantages of the present invention are explained in detail below with reference to the accompanying drawings and specific embodiments.

Figure 1:
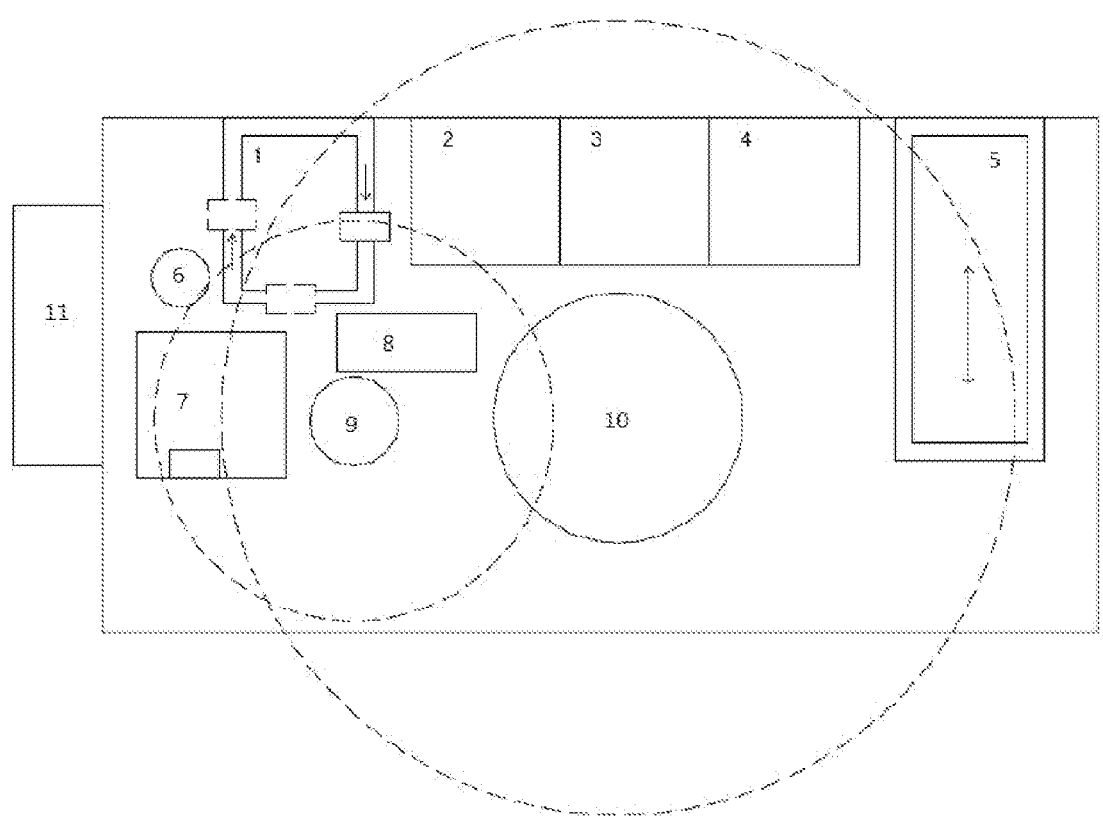
FIG. 1 is a schematic structural view of an assembly system for automotive lamps according to a preferred embodiment of the present invention.

Referring to FIG. 1 which is a schematic structural view of an assembly system for automotive lamps. As can be seen from the figure, the assembly system of this embodiment primarily comprises: a lamp housing and lamp lens transport station 1, a first optical test station 2, a second optical test station 3, a whole lamp sealing performance test station 4 and a whole lamp transport station 5—which are disposed sequentially. In addition, a gluing station 6 is disposed near the lamp housing and lamp lens transport station 1, and an assembly station 7 is disposed near the gluing station 6 and the lamp housing and lamp lens transport station 1; a whole lamp turnover station 8 is disposed near the lamp housing and lamp lens transport station 1 and the first optical test station 2; and the assembly system is provided with a lamp housing carrying robot 9 and a whole lamp carrying robot 10.

In view of the said arrangement, the assembly system can realize: using the lamp housing and lamp lens transport station 1 for the loading of lamp housings and lamp lenses; using the gluing station 6 to dispense glue to lamp housings; using the assembly station 7 to assemble lamp housings and lamp lenses to form whole lamps; using the first optical test station 2 or the second optical test station 3 to perform test on the optical quality of whole lamps and make adjustment thereto; using the whole lamp sealing performance test station 4 to conduct sealing performance test on whole lamps; using the lamp housing carrying robot 9 and the whole lamp carrying robot 10 to transfer lamp housings, lamp lenses and assembled whole lamps; using the whole lamp turnover station 8 to regulate the problem associated with operating rate differences between fastening and assembly processes and subsequent optical and sealing performance test processes; and using the whole lamp transport station 5 to provide a waiting area for the unloading of whole lamp, thereby relieving the urgent need for manual operation during the process of whole lamp unloading.

Figure 2:
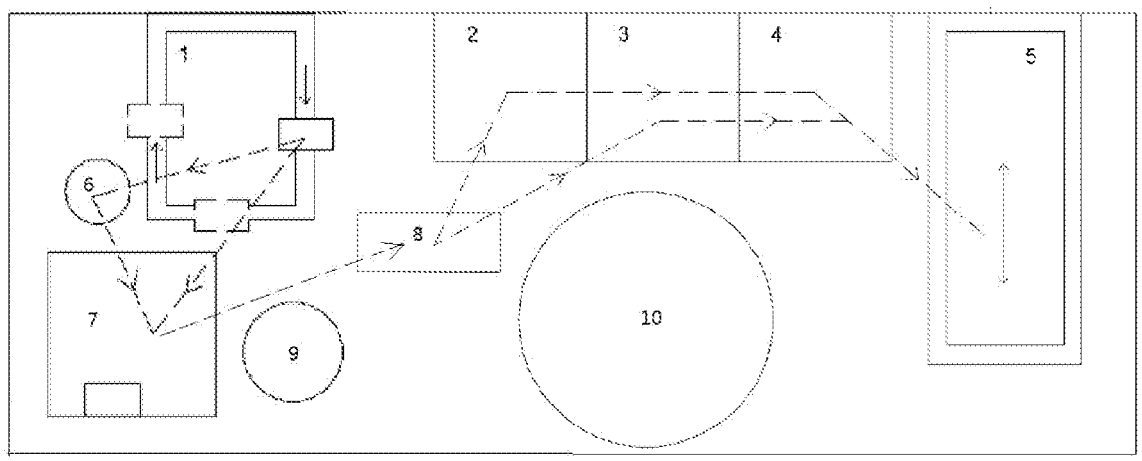
FIG. 2 is a schematic flow diagram of an operation method of the assembly system for automotive lamps according to FIG. 1.

In another embodiment of the present invention, the gluing station 6, the lamp housing and lamp lens transport station 1, the assembly station 7 and the whole lamp turnover station 8 are located in the working area of the lamp housing carrying robot 9; and the whole lamp turnover station 8, the first optical test station 2, the second optical test station 3, the whole lamp sealing performance test station 4 and the whole lamp transport station 5 are located in the working area of the whole lamp carrying robot 10. Therefore, in view of the design of the embodiment as shown FIG. 2, the operation method of the assembly system specifically includes the following steps:

An automotive lamp housing is manually placed at the loading position of the lamp housing and lamp lens transport station 1; then, the lamp housing and lamp lens transport station 1 transports the automotive lamp housing to be processed to a processing location thereat.

The lamp housing carrying robot 9 moves to the location of the lamp housing and lamp lens transport station 1, grabs the lamp housing from the processing location, and moves it to the gluing station.

The gluing station 6 dispenses glue to the lamp housing.

After glue dispensing, the lamp housing carrying robot 9 transports the lamp housing to the assembly station 7.

In the meantime, an automotive lamp lens is manually placed at the loading position of the lamp housing and lamp lens transport station 1; and the lamp housing and lamp lens transport station 1 transports the automotive lamp lens to be processed to a processing location.

The lamp housing carrying robot 9 goes back to the lamp housing and lamp lens transport station 1 and grabs the lamp lens, moves it to the assembly station 7, and fastens the lamp lens to the lamp housing to form a whole lamp;

Thereafter, the lamp housing carrying robot 9 removes the assembled whole lamp from the assembly station 7 and transfers it to the whole lamp turnover station 8 to be processed subsequently.

Thereafter, the whole lamp carrying robot 10 moves to the whole lamp turnover station 8 and transports the whole lamp from the whole lamp turnover station 8 to the first optical test station 2 or the second optical test station 3; the first optical test station 2 or the second optical test station 3 can perform optical test on the whole lamp and adjust the whole lamp based on the optical data obtained for better optical quality.

After the optical test, the whole lamp carrying robot 10 carriess the whole lamp from the first optical test station 2 or the second optical test station 3 to the whole lamp sealing performance test station 4; the whole lamp sealing performance test station 4 conducts sealing performance test on the whole lamp.

After the sealing test, the whole lamp carrying robot 10 carries the whole lamp from the whole lamp sealing performance test station 4 to the whole lamp transport station 5, and the whole lamp waits to be unloaded here.

It can be seen from the design of this embodiment that the use of two functional robots for work coordination more significantly increases the degree of automation of the assembly processes. Moreover, the whole lamp turnover station is added in this embodiment to enable the whole lamp integrated in the preceding process to wait at the whole lamp turnover station for a vacant station meant for a subsequent process, thereby avoiding process stoppage and the unnecessary occupation of various other functional stations or robots caused by operating rate differences between preceding process and subsequent process, and greatly improving the working efficiency of the assembly process. In addition, a whole lamp transport station is also provided in this embodiment to enable the whole lamp that has been tested to wait at the whole lamp transport station to be unloaded. This reduces the speed requirement for the unloading of the whole lamp and relieves the pressure of manual unloading, and especially it can prevent the equipment from having to go into standby mode due to worker absence.

More preferably, in another preferred embodiment of the present invention, the lamp housing and lamp lens transport station 1 is a circular transport station and provided with at least two loading positions with positioning fixtures corresponding to the automotive lamp housing or the automotive lamp lens disposed at the loading positions, and when a lamp housing or lamp lens is placed at the loading position, the positioning fixture fastens the lamp housing or lamp lens to prevent the lamp housing or lamp lens from falling off or deviating from its position during transportation, which would result in the lamp housing carrying robot being rendered unable to grab the lamp housing or lamp lens accurately. The specific processing steps of the lamp housing and lamp lens transport station 1 include:

When a first loading position with the lamp housing placed thereat moves to the processing location preset for the lamp housing carrying robot 9, the lamp housing carrying robot 9 grabs the lamp housing from the first loading position; and when a second loading position with the lamp lens placed thereat moves toward the processing location, and when the lamp housing carrying robot 9 moves back to the lamp housing and lamp lens transport station, the second loading position arrives at the processing location preset for the lamp housing carrying robot 9, the lamp housing carrying robot 9 grabs the lamp lens from the second loading position. The abovementioned design uses one transport station to realize alternate loading of lamp housing and lamp lens, and this decreases the unnecessary occupation of various other functional stations and fully makes use of working time difference of the lamp housing carrying robot, thereby greatly improving the working efficiency of the assembly system.

More preferably, in another preferred embodiment of the present invention, the gluing station 6 is provided with a glue dispensing gun and a plasma processing unit, so that the plasma processing unit can be used to first perform surface treatment on the glue groove surface of the automotive lamp housing, and the glue dispensing gun can be used to dispense glue so as to increase the rigorousness of the assembly. The specific processing steps include:

The lamp housing carrying robot 9 moves the lamp housing according to a preset route; the plasma processing unit at the gluing station 6 performs surface treatment on the surface of the automotive lamp housing; the lamp housing carrying robot 9 moves the lamp housing according to a preset route, and the glue dispensing gun at the gluing station 6 dispenses glue to the glue groove of the lamp housing. Given that different movement routes can be set for the lamp housing carrying robot 9 based on the shape of the glue groove, this embodiment can be used for lamp housings of different shapes by merely adjusting the routes of the robots.

In another preferred embodiment of the present invention, the assembly station 7 is provided with a nail gun and a nailing fixture so as to position and fix the lamp housing placed at the assembly station 7 and to fix the fastened lamp housing and lamp lens by shooting nails into them. Therefore, it is ensured that the lamp housing does not undergo any displacement during the nailing process, and the accuracy of nailing operation is ensured.

In another preferred embodiment of the present invention, the whole lamp turnover station 8 includes a workpiece platform, and the workpiece platform rotates at a preset rate. The workpiece platform is provided with at least one loading position or unloading position, and the loading position or unloading position may be at the same spot or different spots. Accordingly, the lamp housing carry robot 9 can place workpiece at the loading position or the unloading position, and the whole lamp carrying robot 10 can take workpieces from the loading position or the unloading position. For example, the workpiece platform may include three loading positions or unloading positions uniformly distributed thereon, where the lamp housing carrying robot 9 places a workpiece at the loading or unloading position once each time when the workpiece platform is rotated by ⅓ of its circumference. The whole lamp carrying robot 9 operates at a slower rate, such as picking a workpiece from the loading or unloading position once per one rotation of the workpiece platform, thereby effectively regulate the problem associated with operating rate differences between preceding process and subsequent process. The specific processing steps include:

The lamp housing carrying robot 9 carries the fastened whole lamp to the loading position of the whole lamp turnover station 8 at a first frequency; thereafter, the whole lamp carrying robot 10 carries the whole lamp from the unloading position of the whole lamp turnover station 8 to the first optical test station or the second optical test station at a second frequency.

In another preferred embodiment of the present invention, when carrying the whole lamp to the first optical test station 2 or the second optical test station 3, the whole lamp carrying robot 10 first detects whether a whole lamp is already present in the first optical test station 2 or the second optical test station 3, and places a new whole lamp to the first optical test station 2 or the second optical test station 3 without a whole lamp. In this embodiment, the use of two optical test stations to work alternately greatly improves the working efficiency of the assembly system and it helps to prevent the processing time of the entire assembly from being affected by the optical test duration.

In another preferred embodiment of the present invention, the gluing station 6 is provided with a gluing machine 11 disposed at the front thereof. In this embodiment, the gluing machine 11 can be set to periodically replenish glue to the gluing station 6. For example, the gluing machine and the glue dispensing gun can be connected by a tube and the gluing machine can automatically replenish glue to the glue dispensing gun at preset times without the necessity to manually judge the remainder of glue in the glue dispensing gun, and this can ensure that there is always enough glue in the glue dispensing gun and prevent substandard assembly caused by insufficiency of glue.

In summary, the present invention provides a more automated and integrated assembly system for automotive lamps. The assembly system uses two kinds of functional robots responsible for the transmission of workpieces between various functional stations to realize automatic gluing, fastening, whole lamp optical test and seal performance test, thereby reducing the amount of manual intervention and improving process integration. By providing a whole lamp turnover station and a whole lamp transport station, the problem associated with waiting time caused by transmission rate differences between processes is reasonably regulated.

Furthermore, the present invention also provides an assembly system with a two-sided assembly line operating simultaneously, which greatly improves the working efficiency of the lamp assembly. Specifically, the assembly system in this embodiment includes a first assembly line and a second assembly line, each of which includes the assembly system in the earlier mentioned embodiments and the first assembly line and the second assembly line are symmetrically disposed, i.e. the arrangements and sequence of the various functional stations on the two assembly lines are the same. Moreover, the first and second assembly lines can operate according to the operation method of the earlier mentioned embodiments.

In another preferred embodiment of the present invention, it is also possible for the two assembly lines to share one gluing machine, and the gluing machine simultaneously supplies glue to the glue dispensing guns of the two assembly lines, thereby avoiding the provision of two gluing machines which results in unnecessary space occupation and cost waste.

The specific embodiments of the present invention have been described in detail above only by way of example, and the invention is not limited to the specific embodiments described above. As will be understood by persons skilled in the art that any equivalent modifications and substitutions to the invention are within the scope of protection thereof. Accordingly, any equivalent changes and modifications made without departing from the spirit of the present invention shall fall with the scope thereof.

What is claimed is:

1. An operation method of an assembly system for automotive lamps, comprising the following steps:
   a lamp housing and lamp lens transport station transports an automotive lamp housing to be processed to a processing location, a lamp housing carrying robot grabs the automotive lamp housing from the lamp housing and lamp lens transport station and moves it to a gluing station;
   the gluing station dispenses glue to the automotive lamp housing;
   the lamp housing carrying robot carries and places the automotive lamp housing to an assembly station;
   the lamp housing and lamp lens transport station transports an automotive lamp lens to be processed to the processing location, the lamp housing carrying robot goes back to the lamp housing and lamp lens transport station and grabs the automotive lamp lens, moves it to the assembly station, and fastens the automotive lamp lens to the automotive lamp housing to form a whole lamp;
   the lamp housing carrying robot carries the whole lamp to a whole lamp turnover station;
   a whole lamp carrying robot carries the whole lamp from the whole lamp turnover station to a first optical test station or a second optical test station;
   the first optical test station or the second optical test station conducts an optical test and adjustment for the whole lamp;
   the whole lamp carrying robot carries the whole lamp from the first optical test station or the second optical test station to a whole lamp sealing performance test station;
   the whole lamp sealing performance test station conducts a sealing performance test on the whole lamp; and
   the whole lamp carrying robot carries the whole lamp from the whole lamp sealing performance test station to a whole lamp transport station, and the whole lamp waits to be unloaded here.

2. The operation method as defined in claim 1, wherein:
   the lamp housing and lamp lens transport station is a circular transport station and provided with at least two loading positions and an unloading position, the automotive lamp housing and the automotive lamp lens being placed alternately at the at least two loading positions;

a first loading position with the automotive lamp housing placed thereat moves to the processing location, and the lamp housing carrying robot grabs the automotive lamp housing from the first loading position; and a second loading position with the automotive lamp lens placed thereat moves toward the processing location, and when the lamp housing carrying robot moves back to the lamp housing and lamp lens transport station, the second loading position arrives at the processing location, and the lamp housing carrying robot grabs the automotive lamp lens from the second loading position.

3. The operation method as defined in claim 1, wherein the step of the gluing station dispensing glue to the automotive lamp housing includes:

the lamp housing carrying robot moves the automotive lamp housing according to a preset route;

a plasma processing unit at the gluing station performs surface treatment on a surface of the automotive lamp housing; and the lamp housing carrying robot moves the automotive lamp housing according to a preset route, and a glue dispensing gun at the gluing station dispenses glue to a glue groove of the automotive lamp housing.

4. The operation method as defined in claim 1, wherein the step of fastening the automotive lamp lens to the automotive lamp housing to form a whole lamp includes:

a nail gun at the assembly station shoots nails into preset positions of the whole lamp to fixedly connect the automotive lamp housing and the automotive lamp lens.

5. The operation method as defined in claim 2, wherein:

a workpiece platform at the whole lamp turnover station rotates at a preset rate;

the lamp housing carrying robot carries the whole lamp to the at least two loading positions of the whole lamp turnover station at a first frequency; and the whole lamp carrying robot carries the whole lamp from the unloading position of the whole lamp turnover station to the first optical test station or the second optical test station at a second frequency.

6. The operation method as defined in claim 1, wherein the step of the whole lamp carrying robot transporting the whole lamp from the whole lamp turnover station to the first optical test station or the second optical test station includes:

the whole lamp carrying robot detects whether a whole lamp is already present in the first optical test station or the second optical test station, and places a new whole lamp to the first optical test station or the second optical test station.

7. The operation method as defined in claim 3, wherein a gluing machine is disposed near the gluing station, and the gluing machine dispenses glue into the glue dispensing gun regularly.

\* \* \* \* \*